United States Patent
Yang et al.

(10) Patent No.: US 10,909,352 B2
(45) Date of Patent: Feb. 2, 2021

(54) FACE DETECTION ACTIVATING METHOD, FACE DETECTION ACTIVATING DEVICE AND ELECTRONIC DEVICE

(71) Applicant: Shenzhen Goodix Technology Co., Ltd., Guangdong (CN)

(72) Inventors: Mengta Yang, Taipei (TW); Jhihwei Jiang, Taipei (TW)

(73) Assignee: Shenzhen Goodix Technology Co., Ltd., Guangdong (CN)

( * ) Notice: Subject to any disclaimer, the term of this patent is extended or adjusted under 35 U.S.C. 154(b) by 150 days.

(21) Appl. No.: 15/979,477

(22) Filed: May 15, 2018

(65) Prior Publication Data

US 2019/0080150 A1  Mar. 14, 2019

Related U.S. Application Data

(63) Continuation of application No. PCT/CN2017/101376, filed on Sep. 12, 2017.

(51) Int. Cl.
   *G06K 9/00* (2006.01)
   *G06K 9/20* (2006.01)
(52) U.S. Cl.
   CPC ..... *G06K 9/00255* (2013.01); *G06K 9/00234* (2013.01); *G06K 9/2054* (2013.01)
(58) Field of Classification Search
   CPC ................................................. G06K 9/00255

USPC ......................................................... 382/118
See application file for complete search history.

(56) References Cited

U.S. PATENT DOCUMENTS

| 8,396,265 | B1 * | 3/2013 | Ross | G06K 9/00288 |
| | | | | 382/118 |
| 2005/0180627 | A1 * | 8/2005 | Yang | G06K 9/00228 |
| | | | | 382/159 |
| 2012/0087539 | A1 | 4/2012 | Chen | |
| 2013/0147843 | A1 * | 6/2013 | Shimizu | H04N 19/85 |
| | | | | 345/647 |
| 2016/0188860 | A1 | 6/2016 | Lee | |
| 2016/0267319 | A1 | 9/2016 | Murillo | |

FOREIGN PATENT DOCUMENTS

| CN | 101907950 A | 12/2010 |
| CN | 102509074 A | 6/2012 |
| CN | 106250850 A | 12/2016 |
| JP | 2002216129 A | 8/2002 |
| WO | 2016/144500 A1 | 9/2016 |

* cited by examiner

*Primary Examiner* — Stephen P Coleman
(74) *Attorney, Agent, or Firm* — Winston Hsu

(57) ABSTRACT

The present application provides a face detection activating method, applied in an electronic device comprising a pixel array. The face detection activating method comprises computing a plurality of first depth values corresponding to a plurality of first pixels within the pixel array, wherein the plurality of first pixels is a part of pixels in the pixel array; and determining whether to activate a face detection operation according to the plurality of first depth values.

11 Claims, 6 Drawing Sheets

FACE DETECTION ACTIVATING METHOD, FACE DETECTION ACTIVATING DEVICE AND ELECTRONIC DEVICE

CROSS REFERENCE TO RELATED APPLICATIONS

The present application is a continuation of international application No. PCT/CN2017/101376, filed on Sep. 12, 2017, of which are incorporated herein by reference in its entirety.

FIELD OF THE INVENTION

The present application relates to a face detection activating method and a face detection activating device, and more particularly, to a face detection activating method and a face detection activating device capable of quickly determining whether to activate the face detection operation and saving power.

BACKGROUND

Face detection technology is widely used in electronic product such as smart phone. The face detection operation is configured to detect whether a human face exists in an image, which requires a plenty of computation. However, if the smart phone aimlessly performs the face detection operation on every single image, it would consume much unnecessary computation corresponding to the face detection operation, and the power consumption of the smart is raised in vain. Therefore, it is necessary to improve the prior art.

SUMMARY

It is therefore a primary objective of the present invention/application to provide a face detection activating method and a face detection activating device capable of quickly determining whether to activate the face detection operation and saving power, to improve over disadvantages of the prior art.

To solve the problem stated above, an embodiment of the present application provides a face detection activating method, applied in an electronic device comprising a pixel array. The face detection activating method comprises computing a plurality of first depth values corresponding to a plurality of first pixels within the pixel array, wherein the plurality of first pixels is a part of pixels in the pixel array; and determining whether to activate a face detection operation according to the plurality of first depth values.

For example, the step of determining whether to activate the face detection operation according to the plurality of first depth values comprises determining whether or not the plurality of first depth values is within a specific depth range, and accordingly determining whether to activate the face detection operation.

For example, the step of determining whether to activate the face detection operation according to whether or not the plurality of first depth values is within the specific depth range comprises determining whether a number of a plurality of second pixels among the plurality of first pixels is greater than a specific number, wherein the plurality of second pixels is a part of the plurality of first pixels and the first depth values corresponding to the plurality of second pixels are within the specific depth range; and determining to activate the face detection operation when the number of the plurality of second pixels is greater than the specific number.

For example, the method further comprises determining whether the plurality of second pixels concentrates in a specific area within the pixel array; and determining to activate the face detection operation when the number of the plurality of second pixels is greater than the specific number and the plurality of second pixels concentrates in the specific area within the pixel array.

For example, the face detection activating method further comprises sensing whether an object satisfies human body physiological condition, and generate a physiologic sensing result; wherein determining whether to activate the face detection operation according to the plurality of first depth values and the physiologic sensing result.

For example, the plurality of first pixels is part of pixel columns or a part of pixel rows of the pixel array.

For example, the plurality of first pixels is uniformly distributed over the pixel array.

An embodiment of the present application provides a face detection activating device comprising a pixel array; a depth computing unit, configured to compute a plurality of first depth values corresponding to a plurality of first pixels within the pixel array, wherein the plurality of first pixels is a part of pixels in the pixel array; and a determining unit, configured to determine whether to activate a face detection operation according to the plurality of first depth values.

The present application utilizes the depth values corresponding to a part of pixels within the pixel array to determine whether to activate the face detection operation or not. Compared to the prior art, it is able to save unnecessary computation of the face detection operation In addition, only the depth values corresponding to the partial pixels are used to determine whether to activate the face detection operation or not, which is able to save both power and time.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Face detection operation, configured to detect whether a human face is within the image, requires a plenty of computation. To reduce unnecessary computation, before the face detection operation is preformed, the present application determines whether to activate the face detection operation according to depth values corresponding to the pixel array. Furthermore, the present application only utilizes the depth values corresponding to a part of pixels within the pixel array to determine whether to activate the face detection operation, which saves power consumption.

Figure 1:
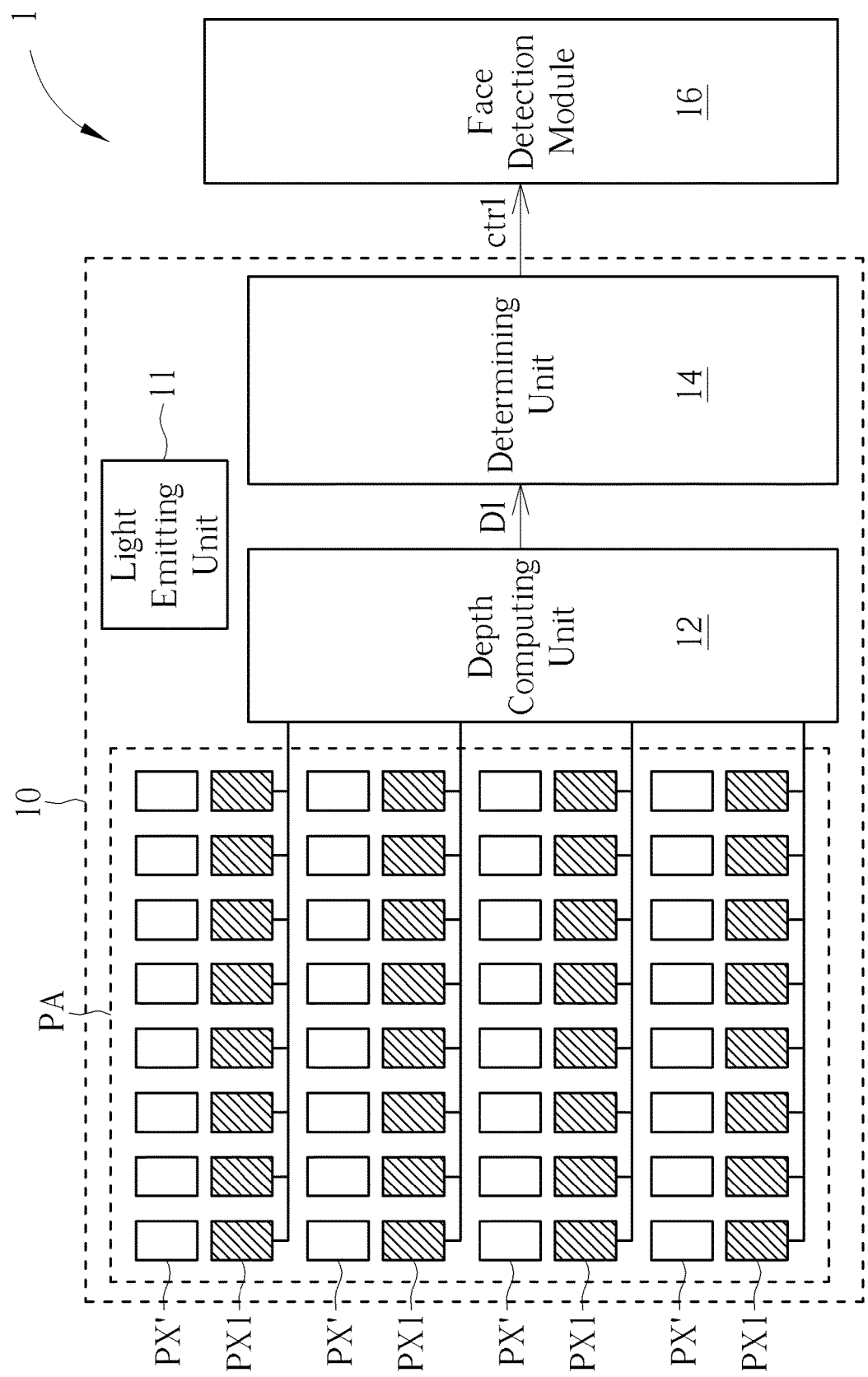
FIG. 1 is a schematic diagram of an electronic device according to an embodiment of the present application.

Specifically, please refer to FIG. 1. FIG. 1 is a schematic diagram of an electronic device 1 according to an embodiment of the present application. The electronic device 1 may be a smart phone, a tablet computer or a signage device, which comprises a face detection activating device 10 and a face detection module 16. The face detection activating device 10 is configured to generate a control signal ctrl, so as to instruct the face detection module 16 whether to perform a face detection operation. The face detection activating device 10 comprises a light emitting unit 11, a pixel array PA, a depth computing unit 12 and a determining unit 14. The light emitting unit 11 may comprise a light emitting diode (LED), configured to emit an incident light. The pixel array PA is configured to receive a reflected light corresponding to the incident light and form an image. The pixel array PA comprises a plurality of pixels. The plurality of pixels within the pixel array PA can be classified into a plurality of pixels PX' and a plurality of first pixels PX1. The depth computing unit 12 is coupled to at least the plurality of first pixels PX1, configured to compute a plurality of first depth values D1 corresponding to the plurality of first pixels PX1, and output the plurality of first depth values D1 corresponding to the plurality of first pixels PX1 to the determining unit 14. The determining unit 14 determines whether to activate the face detection operation according to the plurality of first depth values D1. In other words, the determining unit 14 generates the control signal ctrl according to the plurality of first depth values D1, so as to instruct the face detection module 16 whether to perform the face detection operation. Moreover, the plurality of first pixels PX1 is enabled when the face detection activating device 10 operates. In other words, when the face detection activating device 10 operates, the plurality of first pixels PX1 receives lights and generates pixel values corresponding to the plurality of first pixels PX1 to the depth computing unit 12. In another perspective, when the face detection activating device 10 operates, the plurality of pixels PX' of the pixel array PA, except the plurality of first pixels PX1, may be OFF or disabled, in order to save power.

Details of the depth computing unit 12 computes the plurality of first depth values D1 corresponding to the plurality of first pixels PX1 according to the pixel values of the plurality of first pixels PX1 are known by the art, which are not narrated herein for brevity. For example, the light emitting unit 11 may emit continuously modulated light, pulse modulated light or structured light. The depth computing unit 12 may utilize time of flight (ToF) or the triangulation method, but not limited, to compute the plurality of first depth values D1 corresponding to the plurality of first pixels PX1.

Figure 2:
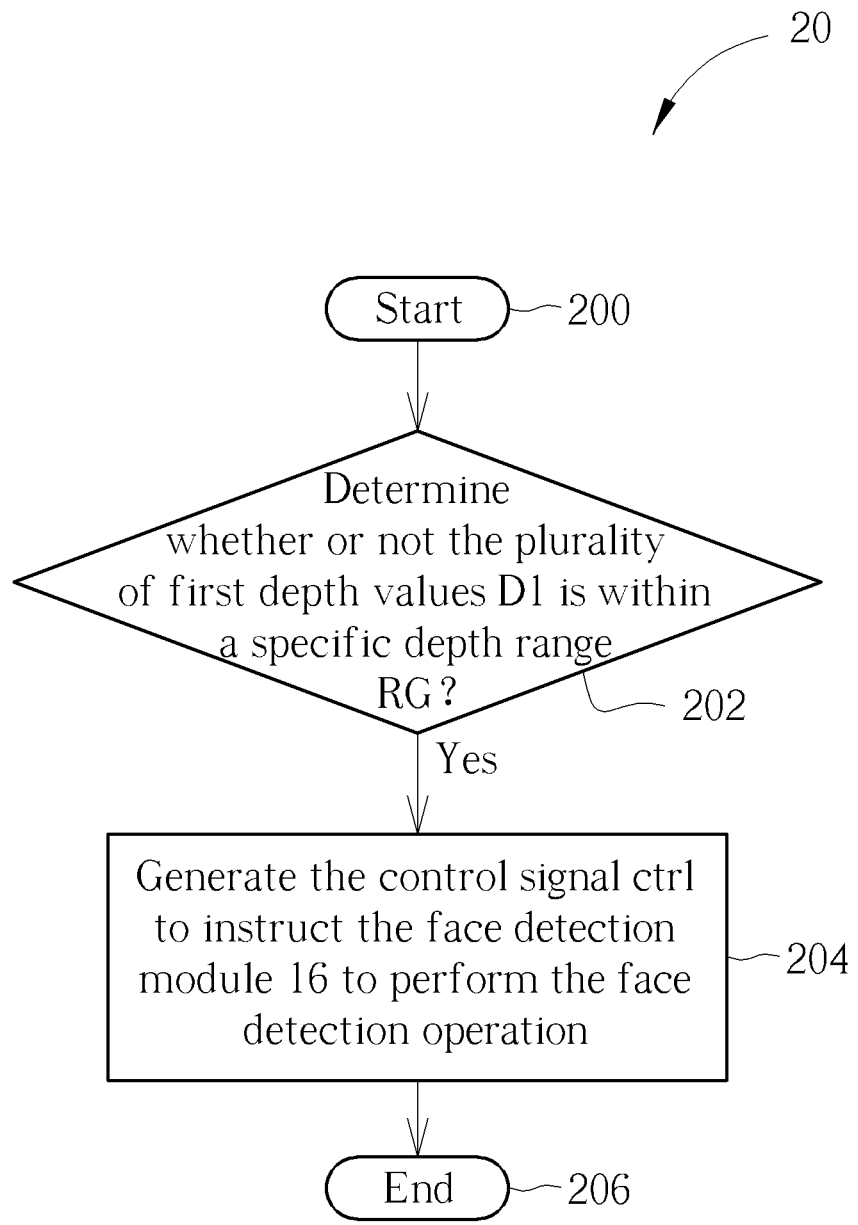
FIG. 2 is a schematic diagram of a determining process according to an embodiment of the present application.

The determining unit 14 may execute a determining process to determine whether to activate the face detection operation according to the plurality of first depth values D1. Please refer to FIG. 2. FIG. 2 is a schematic diagram of a determining process 20 according to an embodiment of the present application. The determining process 20, executed by the determining unit 14, comprises the following steps:

Step 200: Start.

Step 202: Determine whether or not the plurality of first depth values D1 is within a specific depth range RG. If yes, go to Step 204.

Step 204: Generate the control signal ctrl to instruct the face detection module 16 to perform the face detection operation.

Step 206: End.

In Step 202, the determining unit 14 determines whether or not the plurality of first depth values D1 is within a specific depth range RG. The specific depth range RG may be determined according to practical situation of the electronic device 1, which may be set by the user or by other operators. For example, when the electronic device 1 perform a selfie operation (i.e., one/user uses with the electronic device to take a picture of oneself), the specific depth range RG may be set as 40-60 centimeters. When the electronic device 1 is a signage device to detect whether or not a person stares on content displayed by the signage device, the specific depth range RG may be set as 0.5-3 meters, and not limited thereto.

In addition, method of the determining unit 14 determining whether or not the plurality of first depth values D1 is within the specific depth range RG is not limited. For example, when there is a human face existing within the image captured by the pixel array PA, it would cause that first depth values D1 corresponding to a specific number of the first pixels PX1 among an entire of the plurality of first pixels PX1 is within the specific depth range RG. Therefore, the determining unit 14 may firstly obtain (e.g., by selecting) a plurality of second pixels PX2, where the second pixels PX2 is a part of the plurality of first pixels PX1 and the first depth values D1 corresponding to the plurality of second pixels PX2 are within the specific depth range RG (which means that the second pixel PX2 has to be the first pixel PX1, but the first pixel PX1 is not necessarily the second pixel PX2), and the determining unit 14 may secondly determine whether a pixel number of the plurality of second pixels PX2 is greater than a specific number N. When the determining unit 14 determines that the pixel number of the plurality of second pixels PX2 is greater than the specific number N, the determining unit 14 determines that the plurality of first depth values D1 is within the specific depth range RG, and generate a determining result DRS at the same time to indicate that the plurality of first depth values D1 is within the specific depth range RG.

When the determining result DRS indicates that the plurality of first depth values D1 is within the specific depth range RG, in Step 204, the determining unit 14 generates the control signal ctrl to instruct the face detection module 16 to perform the face detection operation, i.e., the determining unit 14 decides to activate the face detection operation.

Figure 3:
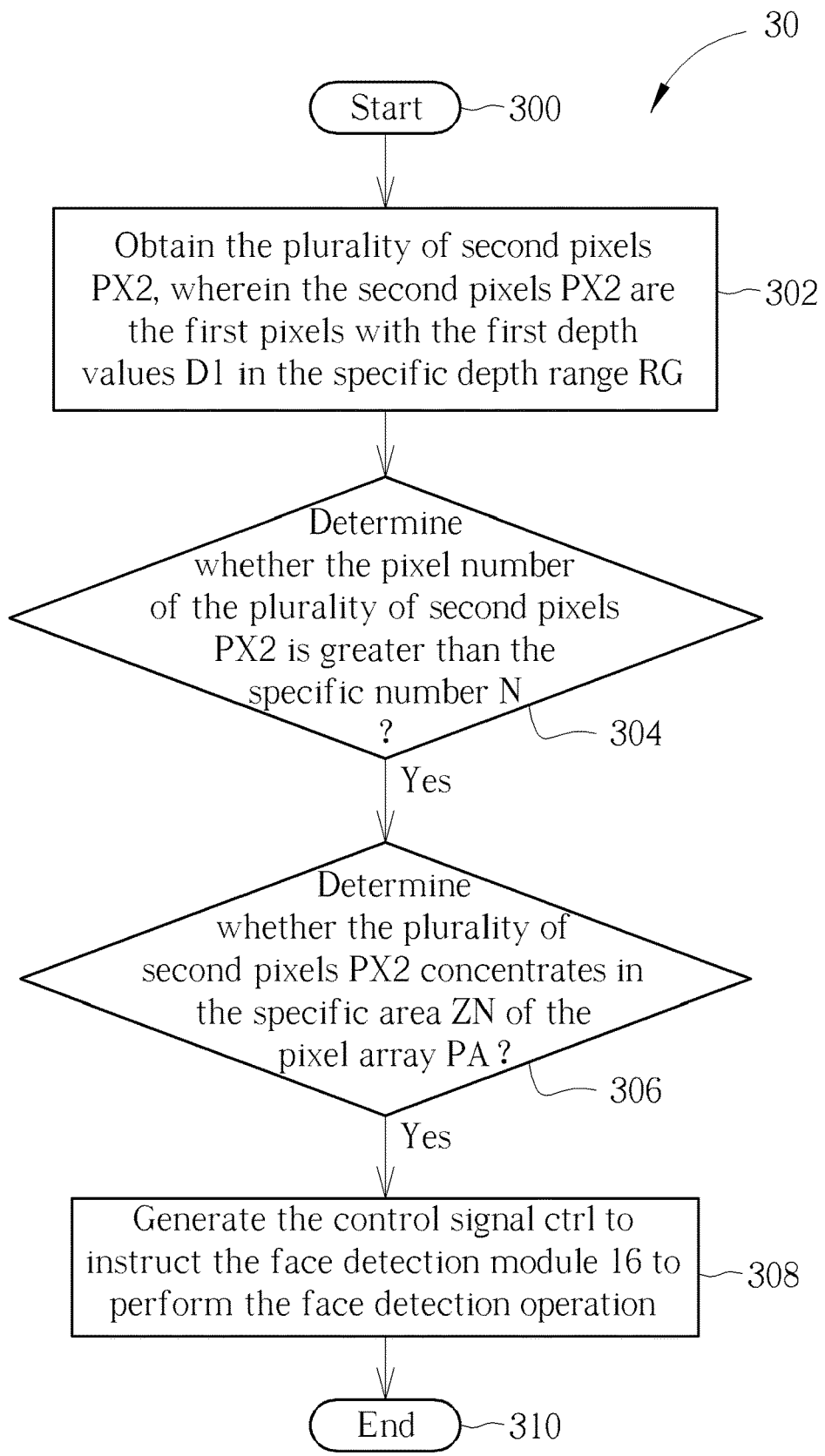
FIG. 3 is a schematic diagram of a determining process according to an embodiment of the present application.

In addition, since the human face image occupies a closed area within the image. Therefore, when there is a human face existing in the image captured by the pixel array PA, in addition to determining whether the number of the plurality of second pixels PX2, with the depth values in the specific depth range RG, is greater than the specific number N, the determining unit 14 may also determine whether the plurality of second pixels PX2, with the depth values in the specific depth range RG, concentrates in a specific area ZN of the pixel array PA. Specifically, please refer to FIG. 3. FIG. 3 is a schematic diagram of a determining process 30 according to an embodiment of the present application. The determining process 30 may be executed by the determining unit 14 and comprises the following steps:

Step 300: Start.

Step 302: Obtain the plurality of second pixels PX2, wherein the second pixels PX2 are the first pixels with the first depth values D1 in the specific depth range RG.

Step 304: Determine whether the pixel number of the plurality of second pixels PX2 is greater than the specific number N. If yes, go to Step 306.

Step 306: Determine whether the plurality of second pixels PX2 concentrates in the specific area ZN of the pixel array PA. If yes, go to Step 308.

Step 308: Generate the control signal ctrl to instruct the face detection module 16 to perform the face detection operation.

Step 310: End.

Details of Steps 302 and 304 may be referred to paragraphs stated in the above and not narrated herein for brevity. In Step 306, the determining unit 14 determines whether the plurality of second pixels PX2 concentrates in the specific area ZN of the pixel array PA. In an embodiment, the determining unit 14 may determine whether a maximum distance $D_{max}$ between the plurality of second pixels PX2 is smaller than a specific a distance Dth. If yes, the determining unit 14 determines the plurality of second pixels PX2 concentrates in the specific area ZN of the pixel array PA. Moreover, the maximum distance $D_{max}$ between the plurality of second pixels PX2 may be a maximum of distances between a second pixel PX2 and another second pixel PX2. In another embodiment, the determining unit 14 may obtain a plurality of coordinates of the plurality of second pixels PX2 in the pixel array PA, obtain a center point of the plurality of second pixels PX2 distributed over the pixel array PA according to the plurality of coordinates, forms a circular area where the center point (of the plurality of second pixels PX2) is taken as the center of the circular area and r is taken as the radius of the circular area, and determine whether a ratio of the second pixels PX2 lies in the circular area compared to the entire plurality of the second pixels PX2 is greater a specific value. If yes, the determining unit 14 determines the plurality of second pixels PX2 concentrates in the specific area ZN of the pixel array PA.

When the pixel number of the plurality of second pixels PX2 is greater than the specific number N and the plurality of second pixels PX2 concentrates in the specific area ZN of the pixel array PA, in Step 308, the determining unit 14 generates the control signal ctrl to instruct the face detection module 16 to perform the face detection operation, i.e., the determining unit 14 decides to activate the face detection operation.

Figure 4:
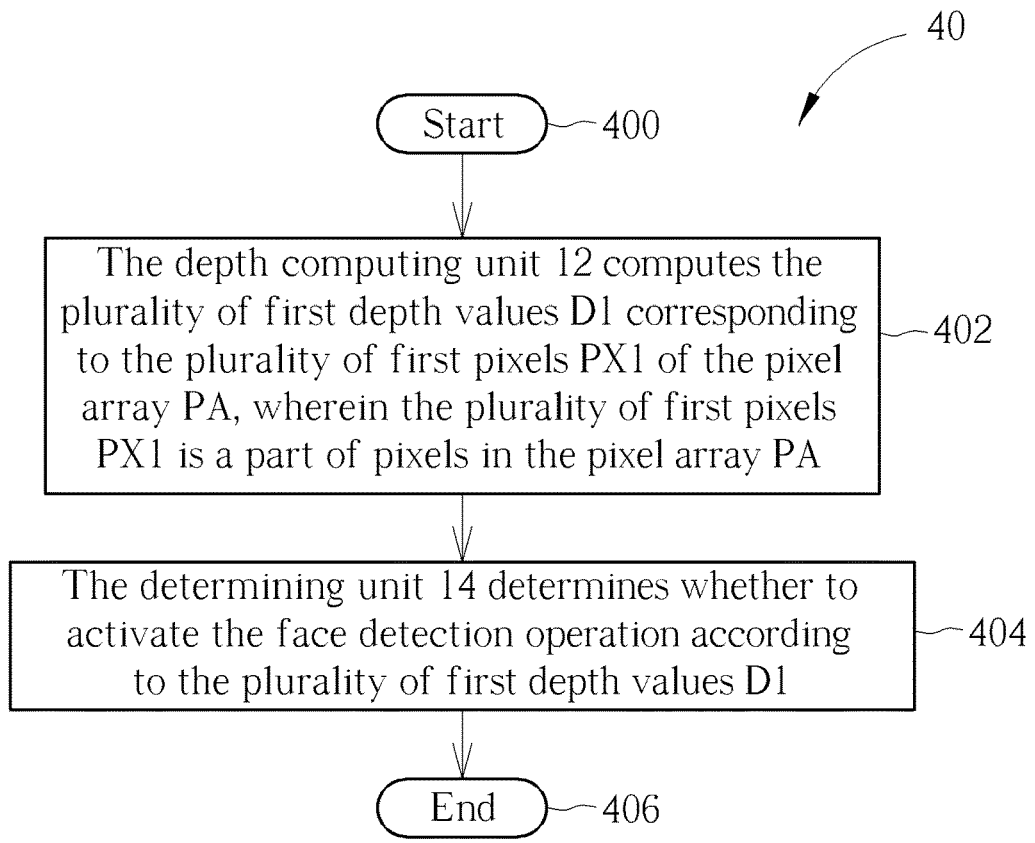
FIG. 4 is a schematic diagram of a process according to an embodiment of the present application.

Operations of the face detection activating device 10 may be summarized as a process. Please refer to FIG. 4. FIG. 4 is a schematic diagram of a process 40 according to an embodiment of the present application. The process 40 may be executed by the face detection activating device 10 and comprises the following steps:

Step 400: Start.

Step 402: The depth computing unit 12 computes the plurality of first depth values D1 corresponding to the plurality of first pixels PX1 of the pixel array PA, wherein the plurality of first pixels PX1 is a part of pixels in the pixel array PA.

Step 404: The determining unit 14 determines whether to activate the face detection operation according to the plurality of first depth values D1.

Step 406: End.

In other words, the process 40 is a pre-process of the face detection operation, which utilizes the depth values corresponding to a part of pixels within the pixel array to determine whether to activate the face detection operation or not. Compared to the prior art, it is able to save unnecessary computation of the face detection operation. In addition, only the depth values corresponding to the partial pixels are used to determine whether to activate the face detection operation or not, which is able to save both power and time.

Figure 5:
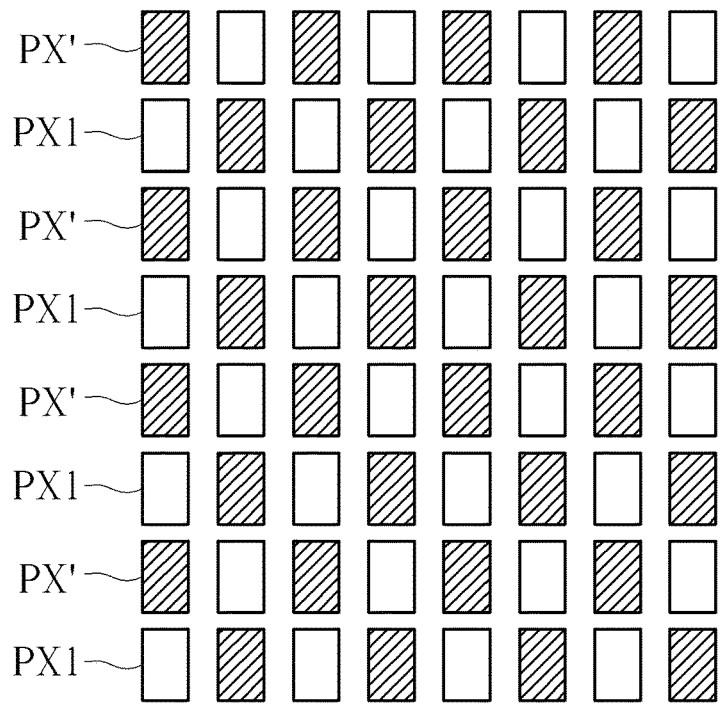
FIG. 5 is a schematic diagram of a plurality of first pixels according to an embodiment of the present application.

Notably, the embodiments stated in the above are utilized for illustrating the concept of the present application. Those skilled in the art may make modifications and alterations accordingly, and not limited herein. For example, in FIG. 1, the plurality of first pixels PX1 is part of pixel columns or a part of pixel rows of the pixel array PA, and not limited thereto. The plurality of first pixels PX1 may be uniformly distributed over the pixel array PA, as shown in FIG. 5. As long as the first pixels PX1 occupies a constant ratio in a block/area within the pixel array PA, i.e., uniformly distributed, the requirements of the present application is satisfied.

Figure 6:
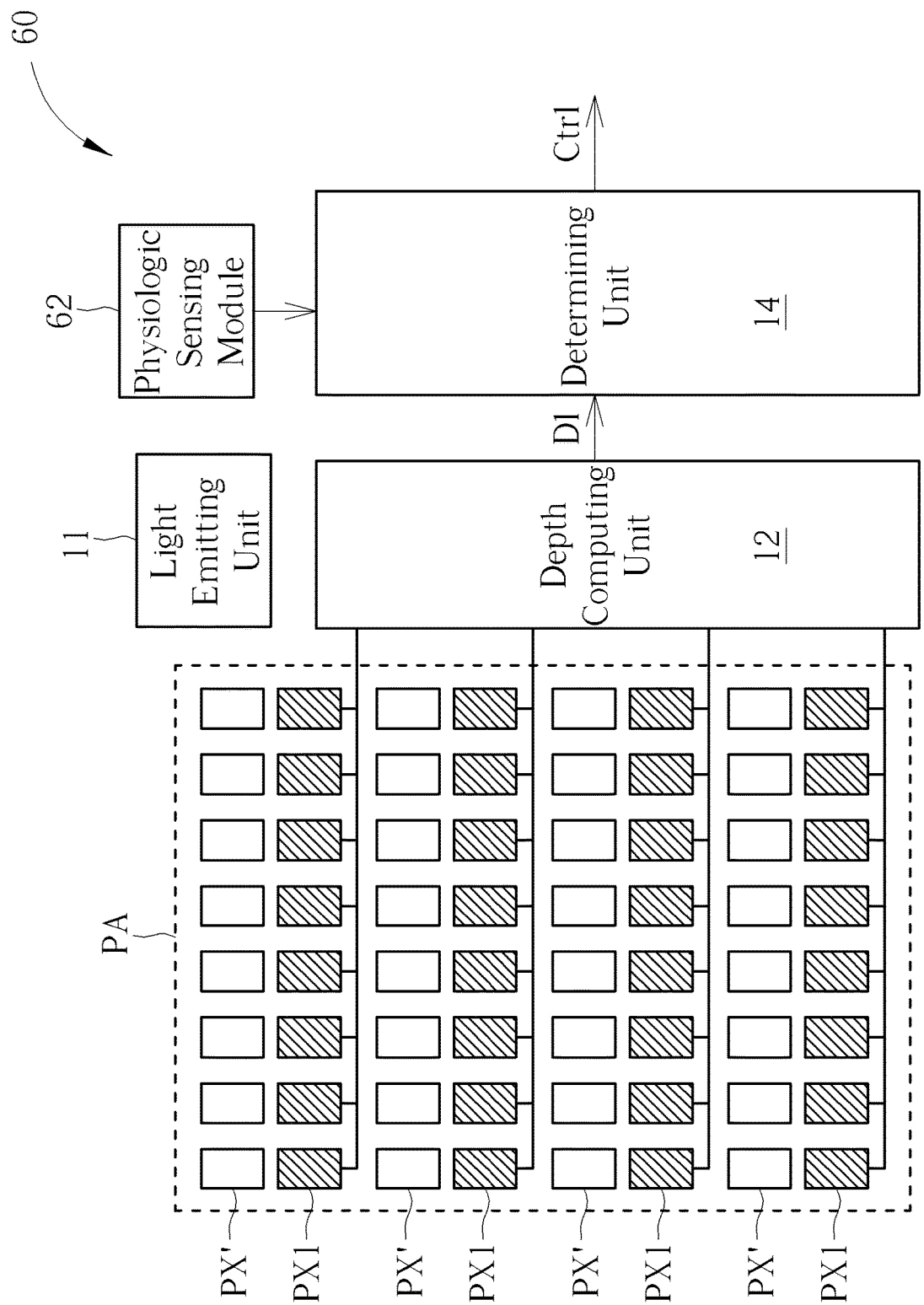
FIG. 6 is a schematic diagram of a face detection activating device according to an embodiment of the present application.
Figure 7:
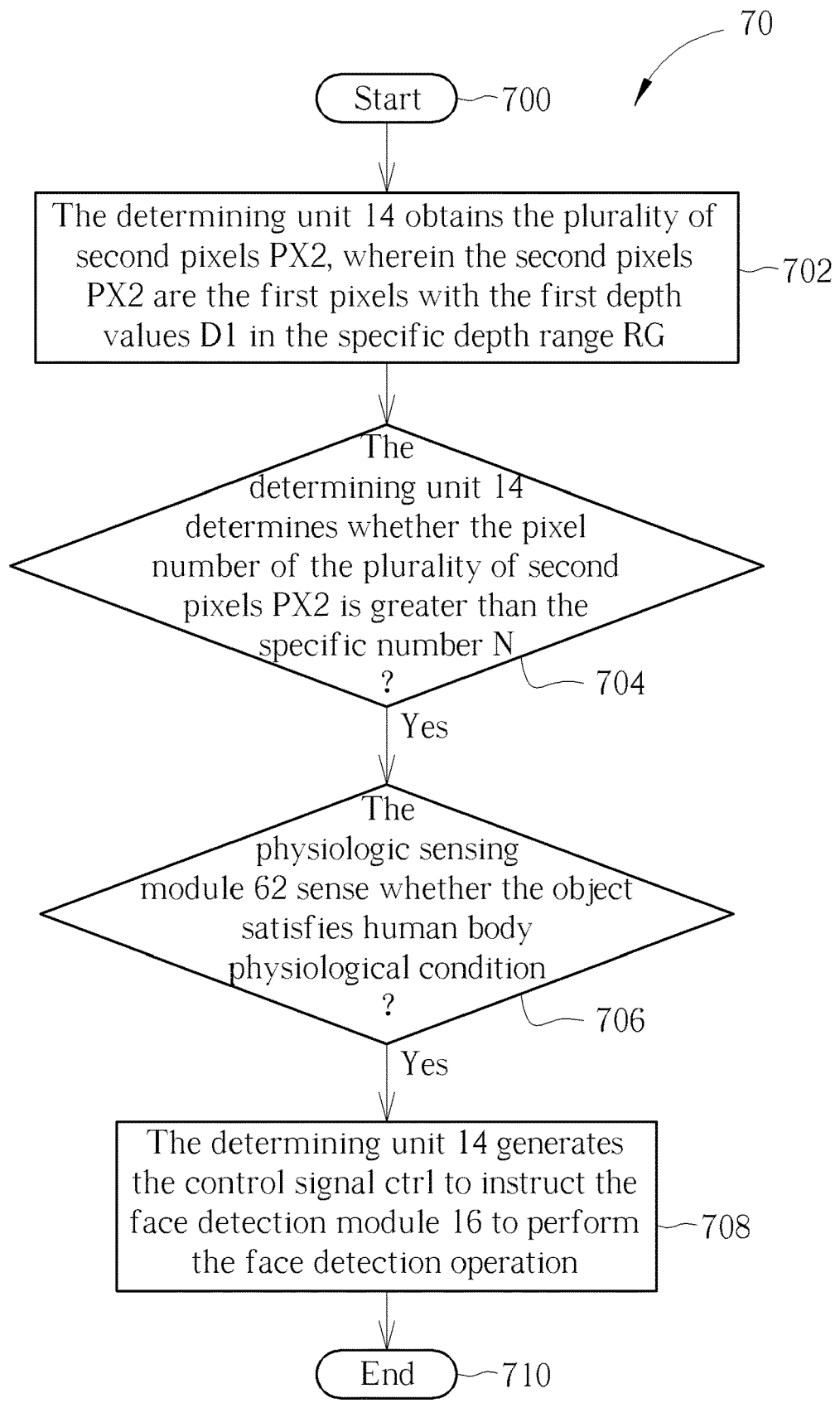
FIG. 7 is a schematic diagram of a process according to an embodiment of the present application.

In addition, please refer to FIG. 6. FIG. 6 is a schematic diagram of a face detection activating device 60 according to an embodiment of the present application. The face detection activating device 60 is similar to the face detection activating device 10, and thus, the same components are denoted by the same notations. Different from the face detection activating device 10, the face detection activating device 60 further comprises a physiologic sensing module 62, which may sense whether an object out of the face detection activating device 60 satisfies a human body physiological condition, and generate a physiologic sensing result PRS. In an embodiment, the physiologic sensing module 62 may sense whether a temperature of the object out of the face detection activating device 60 is within a range of human body temperature (e.g., 34° C.-42° C.). If not, even (in Step 304) it is determined that the plurality of first depth values D1 is within the specific depth range RG, a possibility of the object being a human face can be excluded. In another embodiment, the physiologic sensing module 62 may perform a skin color detection on a surface color of the object, which is to detect whether RGB values of the pixels of the object image are within a specific range of pixel value. If not, even (in Step 304) it is determined that the plurality of first depth values D1 is within the specific depth range RG, a possibility of the object being a human face can be excluded. In other words, the determining unit 14 may determine whether to activate the face detection operation according to the plurality of first depth values D1 and the physiologic sensing result PRS. Operations of the face detection activating device 60 may be summarized as a process 70. As shown in FIG. 7, the process 70 comprises the following steps:

Step 700: Start.

Step 702: The determining unit 14 obtains the plurality of second pixels PX2, wherein the second pixels PX2 are the first pixels with the first depth values D1 in the specific depth range RG.

Step 704: The determining unit 14 determines whether the pixel number of the plurality of second pixels PX2 is greater than the specific number N. If yes, go to Step 706.

Step 706: The physiologic sensing module 62 sense whether the object satisfies human body physiological condition. If yes, go to Step 708.

Step 708: The determining unit 14 generates the control signal ctrl to instruct the face detection module 16 to perform the face detection operation.

Step 710: End.

In summary, the present application utilizes the depth values corresponding to a part of pixels within the pixel array to determine whether to activate the face detection operation or not. Compared to the prior art, it is able to save unnecessary computation of the face detection operation In addition, only the depth values corresponding to the partial pixels are used to determine whether to activate the face detection operation or not, which is able to save both power and time.

The foregoing is only embodiments of the present application, which is not intended to limit the present application. Any modification following the spirit and principle of the present application, equivalent substitutions, improvements should be included within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A face detection activating method, applied in an electronic device comprising a pixel array, characterized in that, the face detection activating method comprises:
   computing a plurality of first depth values respectively corresponding to a plurality of first pixels within the pixel array according to a plurality of pixel values of the plurality of first pixels, wherein the plurality of first pixels is a part of pixels in the pixel array; and
   determining whether to activate a face detection operation according to the plurality of first depth values;
   wherein the step of determining whether to activate the face detection operation according to the plurality of first depth values comprises:
      determining whether or not the plurality of first depth values is within a specific depth range; and
      determining to activate the face detection operation when a specific portion of the plurality of first depth values is within the specific depth range,
   wherein the face detection activating method further comprises:
      sensing whether an object satisfies human body physiological condition, and generate a physiologic sensing result; and
      determining whether to activate the face detection operation according to the plurality of first depth values and the physiologic sensing result.

2. The face detection activating method of claim 1, characterized in that, the plurality of first pixels is part of pixel columns or a part of pixel rows of the pixel array.

3. The face detection activating method of claim 1, characterized in that, the plurality of first pixels is uniformly distributed over the pixel array.

4. The face detection activating method of claim 1, characterized in that, the step of determining whether to activate the face detection operation according to whether or not the plurality of first depth values is within the specific depth range comprises:
   determining whether a number of a plurality of second pixels among the plurality of first pixels is greater than a specific number, wherein the plurality of second pixels is a part of the plurality of first pixels and the first depth values corresponding to the plurality of second pixels are within the specific depth range; and
   determining to activate the face detection operation when the number of the plurality of second pixels is greater than the specific number.

5. The face detection activating method of claim 4, characterized in that, the method further comprises:
   determining whether the plurality of second pixels concentrates in a specific area within the pixel array; and
   determining to activate the face detection operation when the number of the plurality of second pixels is greater than the specific number and the plurality of second pixels concentrates in the specific area within the pixel array.

6. A face detection activating device, characterized by, comprising:
   a pixel array;
   a depth computing unit, configured to compute a plurality of first depth values respectively corresponding to a plurality of first pixels within the pixel array according to a plurality of pixel values of the plurality of first pixels,
      wherein the plurality of first pixels is a part of pixels in the pixel array; and
   a determining unit, configured to determine whether to activate a face detection operation according to the plurality of first depth values;
   wherein the determining unit determines whether or not the plurality of first depth values is within a specific depth range;
   wherein the determining unit determines to activate the face detection operation when a specific portion of the plurality of first depth values is within the specific depth range;
   wherein the face detection activating device further comprises:
      a physiologic sensing module, configured to sense whether an object satisfies human body physiological condition, and generate a physiologic sensing result;
      wherein the determining unit determines whether to activate the face detection operation according to the plurality of first depth values and the physiologic sensing result.

7. The face detection activating device of claim 6, characterized in that, the plurality of first pixels is part of pixel columns or a part of pixel rows of the pixel array.

8. The face detection activating device of claim 6, characterized in that, the plurality of first pixels is uniformly distributed over the pixel array.

9. The face detection activating device of claim 6, characterized in that, the determining unit is configured to execute the following steps:
   determining whether a number of a plurality of second pixels among the plurality of first pixels is greater than a specific number, wherein the plurality of second pixels is a part of the plurality of first pixels and the first depth values corresponding to the plurality of second pixels are within the specific depth range; and
   determining to activate the face detection operation when the number of the plurality of second pixels is greater than the specific number.

10. The face detection activating device of claim 9, characterized in that, the determining unit is configured to execute the following steps:
   determining whether the plurality of second pixels concentrates in a specific area within the pixel array; and
   determining to activate the face detection operation when the number of the plurality of second pixels is greater than the specific number and the plurality of second pixels concentrates in the specific area within the pixel array.

11. An electronic device, characterized by, comprising:
a face detection activating device, comprising a pixel array;
a depth computing unit, configured to compute a plurality of first depth values respectively corresponding to a plurality of first pixels within the pixel array according to a plurality of pixel values of the plurality of first pixels,
  wherein the plurality of first pixels is a part of pixels in the pixel array; and
a determining unit, configured to determine whether to activate a face detection operation according to the plurality of first depth values; and
a face detection module, coupled to the pixel array of the face detection activating device, configured to perform the face detection operation;
wherein the determining unit determines whether or not the plurality of first depth values is within a specific depth range;
wherein the determining unit generates a control signal to the face detection module when a specific portion the plurality of first depth values is within the specific depth range, so as to instruct the face detection module whether to perform the face detection operation;
wherein the face detection activating device further comprises:
  a physiologic sensing module, configured to sense whether an object satisfies human body physiological condition, and generate a physiologic sensing result;
  wherein the determining unit determines whether to activate the face detection operation according to the plurality of first depth values and the physiologic sensing result.

* * * * *